(12) United States Patent
Gong

(10) Patent No.: US 7,020,656 B1
(45) Date of Patent: Mar. 28, 2006

(54) PARTITION EXCHANGE LOADING TECHNIQUE FOR FAST ADDITION OF DATA TO A DATA WAREHOUSING SYSTEM

(75) Inventor: Yu Gong, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

(21) Appl. No.: 10/154,751

(22) Filed: May 23, 2002

Related U.S. Application Data

(60) Provisional application No. 60/379,069, filed on May 8, 2002.

(51) Int. Cl.
*G06F 17/30* (2006.01)
(52) U.S. Cl. .................................. 707/101; 707/104.1
(58) Field of Classification Search .................. 707/1, 707/2, 3, 4, 5, 6, 7, 8, 9, 10, 100, 101, 102, 707/104.1, 206, 204; 714/6; 709/201
See application file for complete search history.

(56) References Cited

U.S. PATENT DOCUMENTS

| | | | | |
|---|---|---|---|---|
| 5,819,298 | A | 10/1998 | Wong et al. | 707/205 |
| 5,870,746 | A | 2/1999 | Knutson et al. | 707/101 |
| 5,890,167 | A | 3/1999 | Bridge, Jr. et al. | 707/204 |
| 5,890,169 | A | 3/1999 | Wong et al. | 707/206 |
| 6,035,412 | A | 3/2000 | Tamer et al. | 714/6 |
| 6,401,098 | B1 * | 6/2002 | Moulin | 707/102 |
| 6,604,110 | B1 | 8/2003 | Savage et al. | |
| 6,728,786 | B1 | 4/2004 | Hawkins et al. | 709/201 |
| 6,768,985 | B1 * | 7/2004 | Plasek et al. | 707/2 |
| 6,845,375 | B1 * | 1/2005 | Sinclair | 707/100 |
| 2003/0149702 | A1 | 8/2003 | Saffer et al. | 707/102 |

FOREIGN PATENT DOCUMENTS

| | | |
|---|---|---|
| EP | 0 992 909 A2 | 4/2000 |
| WO | WO 02/05116 A2 | 1/2002 |
| WO | WO 02/097676 A2 | 12/2002 |

OTHER PUBLICATIONS

Current Claims of International Application No. PCT/US2004/025805, 8 pages.
International Searching Authority, "Notification of Transmittal of the International Search Report and the Written Opinion of the International Searching Authority, or the Declaration," dated Dec. 3, 2004, 12 pages.
U.S. Appl. No. 09/968,067, filed Sep. 28, 2001.
U.S. Appl. No. 10/155,412, filed May 23, 2002.
U.S. Appl. No. 10/159,812, filed May 31, 2002.

\* cited by examiner

*Primary Examiner*—Jeffrey Gaffin
*Assistant Examiner*—Yicun Wu
(74) *Attorney, Agent, or Firm*—Hickman Palermo Truong & Becker, LLP; Christopher J. Brokaw

(57) ABSTRACT

A method and apparatus is provided for adding data to a database system. A data structure is formed by a plurality of partitions is stored. A first identifier is assigned to an available partition in the data structure. A new set of data is received. The new set of data is re-assigned the first identifier so that the new set of data is identified as one of the plurality of partitions that forms the data structure.

53 Claims, 7 Drawing Sheets

PARTITION EXCHANGE LOADING TECHNIQUE FOR FAST ADDITION OF DATA TO A DATA WAREHOUSING SYSTEM

CROSS REFERENCE TO RELATED APPLICATIONS

This application claims priority from U.S. Provisional Application Ser. No. 60/379,069 entitled "Partition Exchange Technique for Operating a Database System", naming Yu GONG as sole inventor, and filed on May 8, 2002.

FIELD OF THE INVENTION

The present invention relates to data warehousing systems. In particular, the present invention relates to techniques for fast addition of data to data warehousing systems.

BACKGROUND OF THE INVENTION

Data warehouses are central databases systems that store data from many external data sources. Data warehouses store data from other databases, servers, work stations, storage disks or other storage mediums. This kind of database system provides a central location for operators and users to analyze data that would otherwise be scattered across multiple, discrete storage mediums. For example, data warehouses enable users to study historical data for purpose of running business logic or models. The historical data may have, at one time, been recorded on individual computers that could not easily share large amounts of stored information with one another.

Extraction, transformation and loading (ETL) operations are performed to move data from scattered external sources into a target database system. Specifically, an extraction operation is executed to retrieve data from one or more data sources. A transformation operation is used to alter the extracted data, and may involve performing conversions, filtering, aggregations, and/or other operations on the data. A loading operation is used to move the translated data into the target database.

When loading data into a data warehouse, the loading performance can be compromised by the amount of data already existing in the database. For example, the amount of time it takes to load the same amount of data into a database increases as the amount of data already existing in the database increases, until the database system's loading performance becomes noticeably poorer after several loading operations have already been performed.

Database systems typically store data in tables. One or more indexes may be built on a table to facilitate fast access to data within the table. Operations that retrieve or manipulate data within a table may first use an index for the table to determine which data items (e.g. rows) in the table are involved in the operations. Although beneficial to queries, indexes are usually pure overhead during loading of new data.

Over time, the tables in the database system become larger as a result of collecting more and more data. As a table becomes larger, the indexes built on the table also become larger. Thus, the deterioration of loading performance is at least partially the result of the database system trying to manage one or more indexes for the table into which new data is being loaded.

Database systems typically use variations of B*-Tree indexes to manage tables. This type of index must be continuously rebalanced and reorganized to account for new data that is added to the table from external data sources. Metadata that identifies data items in the table form nodes that are arranged to correspond to columns or other portions of the table. This metadata is used to form nodes for the index. The B*-Tree index arranges the nodes so that there is a top branch node, subsequent branch nodes, and many leaf nodes. One feature of B*-Tree indexes, when used in traditional database systems and databases, is that when new entries are inserted into this type of index, routines are automatically executed to "balance" the index so that the top branch node is centrally positioned, with equal number of branches to that node's right and left. Leaf nodes to any branch node are similarly distributed, so that each branch node is balanced. Furthermore, the B*-Tree index monitors the depth of the leaf nodes, so that retrieval of any data item from anywhere in the table takes approximately the same amount of time.

There is another type of index structure, known as bitmap index. The maintenance of bitmap indexes in the event of adding new data is even more expensive than balancing B*-Tree indexes.

It is more difficult for the database system to manage the index as the index becomes larger. The index becomes larger by adding nodes and increasing in width and depth. In typical situations, the amount of data existing in a data warehousing system is usually much larger than the amount of data being inserted into it, and the loading performance of a table is noticeably affected by the size of the indexes of the table.

Data in tables of a database system must usually satisfy certain conditions, known as constraints. Examples of constraints are that data of some columns must be unique (unique constraint), data of some columns must have appeared in another table (referential constraint), or more general conditions (check constraint).

Tables can be stored in partitioned or monolithic forms. Each partition of a partitioned table is associated with a partition condition which specifies what data can reside in that partition. Each partition of a partitioned table is physically stored like a monolithic table, but logically it is a member of a larger table. The logical membership relationship is recorded by the database system.

In a partitioned table, all constraints are further categorized into global constraints and local constraints. Global constraints are conditions that must be satisfied by data items in the table without regard to partitions. Local constraints are conditions that must be satisfied by all data items in a particular partition of the table. In a data warehousing system, constraints are usually local, or can be easily converted to local constraints.

If new data is loaded into a table, traditional database systems write the new data to one or more partitions in the table. During the loading of new data, the entire table is checked for satisfaction of both local and global constraints. If new data is written to only one partition, database systems still check the entire table for satisfaction of all local and global constraints. If the new data causes one of the constraints to fail, the loading of the new data is undone.

A data warehousing system is normally a central database in a business unit, which may range from a mid-sized department to a large enterprise. The central database collects subject oriented (such as sales, products, or customers, etc.) data from distributed locations of the business unit. The scattered information is integrated at the central database for queries by business analysis software. To serve the business analysis, a data warehouse normally must retain historical data. In other words, once collected, data normally stay in the data warehouse for a long period of time without being changed or purged. At regular business closings, new data need to be loaded into the database. As a result, the database size increases over time. Partitioning is a traditional method to organize the large amount of data into more manageable chunks. It is also traditionally used to help queries to prune unwanted data. But the loading of new data still suffer from index and constraint overhead. The application describes a method that enables the partitioning technique to also help speed up the data loading process in a data warehousing environment.

SUMMARY OF THE INVENTION

Partition exchange loading (PEL) techniques are provided for inserting data into and removing data from a database system.

A data warehousing system stores data in a data structure formed from a plurality of partitions. In one embodiment, a partition exchange technique is used to enter data into the partitioned data structure. Some of the partitions in the data structure are ready to receive new data. Each partition is assigned an identifier. New data is received and materialized in one or more data structures that are separate from the partitioned data structure. Such data structures are referred to herein as external partitions. The new data may be integrated into the data structure by replacing an identifier of one of the empty partitions of the data structure with the identifier of a corresponding external partition.

As shall be described in greater detail hereafter, each external partition may be implemented as a separate external table. In addition, each external partition may have one or more indexes that are merged into an index of the data structure when the external partitions are exchanged into the data structure.

In another embodiment, a partition exchange technique is used to remove data from the data structure of the database system. Partitions in the data structure having data are selected for removal. An external partition is either empty or contains new data that is to be integrated into the data structure of the database system. The selected partition is replaced by the external partition by assigning the identifier of the external partition to the selected partition. This results in the selected partition being removed from the data structure, and in the external partition forming a portion of the data structure.

Materializing new data in an external partition creates the greatest freedom in coping with indexing and constraint management overheads. Data can be first inserted into index-free and constraint-free external partition(s). Usually, inserting into such overhead-free table(s) can utilize maximum parallel processing power of the machine. After an external partition is formed, indexes and constraints can be created at faster possible speeds using maximum parallelism.

In contrast, if data is directly inserted into a target table that carries live indexes and constraints, index expansion and constraint checking are done at the same time when data are inserted. It is generally very difficult to maximize the parallelism of all the processing requirements. Finally, the PEL technique does not add new data in a target table until all is determined to be fine. In contrast, if while directly inserting into the target table, some error happens half way, the user may have to spend a significant amount of time to clean up already committed data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
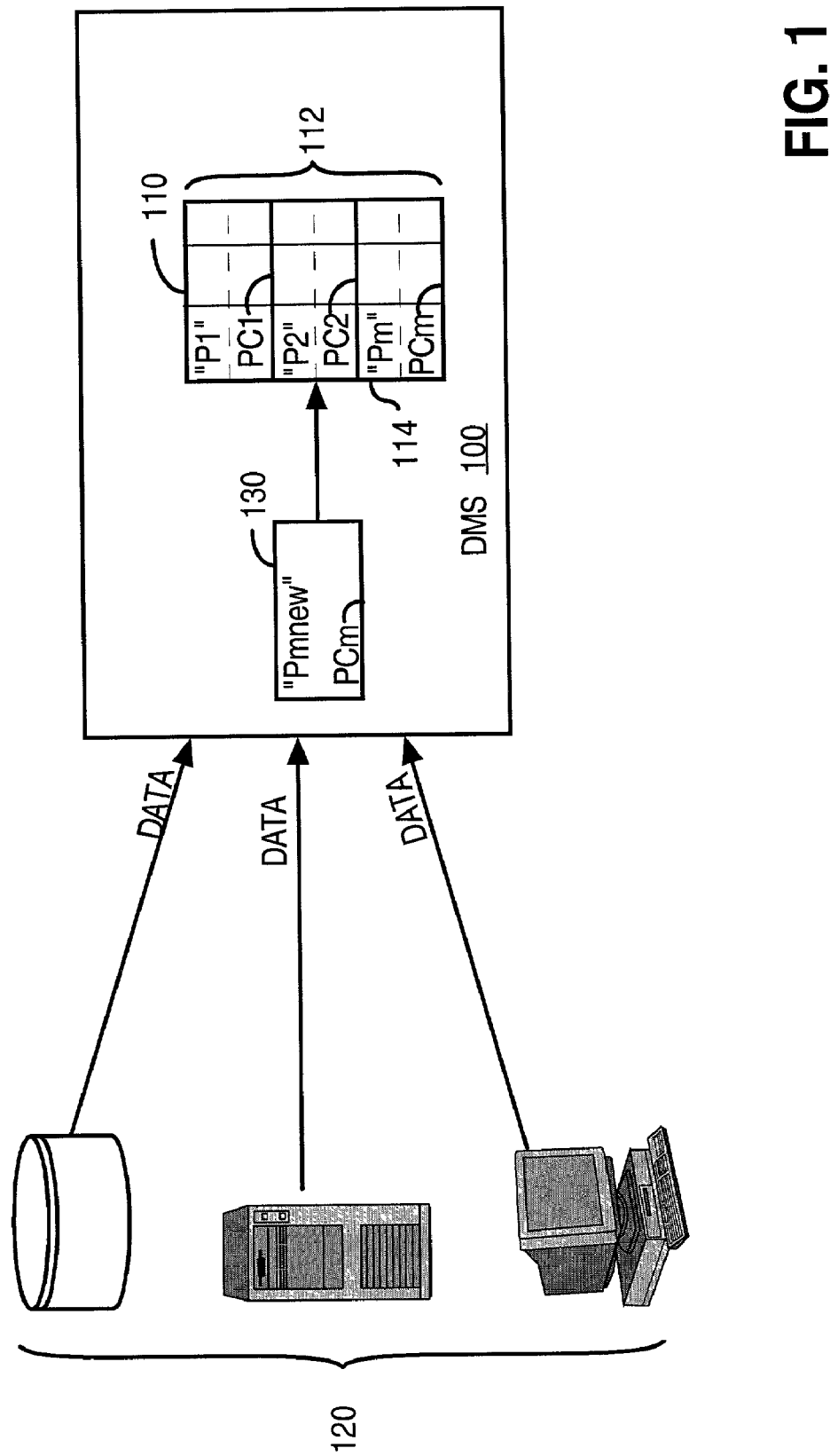
FIG. 1 is a system diagram of a database system configured to execute a partition exchange loading technique.

A method and apparatus are described for inserting data into a data warehouse. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

DEFINITIONS

"Database systems" refers to a computer system, or combination of computer systems, that maintains and operates a database. The database is used to maintain one or more data structures for storing data items. The database system may also include a database server, or integrated server functionality, to perform functions for database maintenance, transactions, and other operations.

"Data warehousing system" refers to a centralized information storage, most often implemented by a database system, which collects and integrates information from distributed locations. The data in a data warehousing system are normally queried by business analysis software, which requires historic data, such as "last quarters revenue of a product". The data in a data warehousing system are normally collected, transformed, and loaded at a regular frequency which follows a business closing schedule. A database system is the predominant tool for implementing a data warehousing system.

The term "data structure" refers to a designated space in a computer readable storage medium that identifies and arranges data stored in the medium. The designated space may also be for identifying and arranging new data before that data is received by the storage medium.

An example of a data structure for use with an embodiment of the invention is a "table." The table is a data structure, typically maintained in a database system, that stores data using parameters and conditions that organize the data into rows and columns.

A "partition" is a logically created designation of a segment for a data structure. Partition conditions are used to define the partitions of the data structure. The partition conditions are logical relationships between segments of the data structure. When a data item is inserted into a partitioned data structure, values, attributes or characteristics of the data are compared to the partition conditions to determine which partition is designated for that data item. The partition condition may be selected by a user of a database system. For example, in a table, all rows whose values in a "last name" column fall within a particular range may be designated by the user as belonging to the same partition.

The term "available partition" refers to a partition that can be removed or altered within another data structure for the purpose of inserting new data into that data structure. In many cases, "available" is synonymous with "empty."

An "identifier" for a partition of a data structure is any feature of the partition that can identify that partition relative to other partitions of the same data structure. The identifier may correspond to metadata for that partition.

"Metadata" refers to information about data. In many cases, metadata refers to an identification of a data item, or a group of data items, in a database system. For example, metadata may refer to a name of a partition assigned a group of data.

An "index" is an arrangement of metadata for data items in a data structure. The arrangement may be defined by a methodology for creating the index. The arrangement provided by the index is used to locate data items in the data system for purpose of performing operations and functions.

A "local index" is an index build on a partitioned table in such a way that each partition maintains a sub-index. The overall index is formed by having a top node branching to multiple top nodes of sub-indexes. In a data warehousing system, local indexes are commonly used on partitioned tables."

A "constraint" is a logical condition that must be satisfied by data elements in a partition or other data structure of a database system. In relational database systems, a constraint is a logical constraint that must be satisfied by rows in a table. A commonly used constraint is a "unique key constraint" which requires that data in some columns are to be unique. Another commonly used constraint is a "referential constraint" which requires that data in one or more columns to exist in a referenced table.

An "exchange event" is an event which signals one partition to be exchanged with another partition. In one embodiment, the exchange event corresponds to a selection made by the user of a database system. This selection may be made through a user-interface, or other interactive mechanism, between the user and the database system.

As used herein, "materialize" means to store data in a medium where it can persist until the data is actively removed.

Overview

According to an embodiment, data can be entered into or removed from a database by exchanging one partition in the database with another partition that is external to the database. The partitions are exchanged by assigning the identifier of one partition to the identifier of the other partition. Exchanging partitions does not require moving data from one partition to another partition.

In one embodiment, a partition of a table is empty, and an external partition has new data that is to be entered into the table. The new data is entered into the table by exchanging the empty partition for the external partition.

In another embodiment, the partition has data that is to be removed from the database, and the partition that is external to the database is empty. Data can be removed from the table by exchanging the partition in the database with the external partition.

Using techniques provided by embodiments of the invention, the performance of database systems is enhanced when inserting data into or removing data from databases. One reason for the enhancement is that data can be moved into and out of the database by switching identifiers of the database partitions. In this way, the data can be moved into or out of a database without having to copy or recreate the data.

For example, a database system does not have to write materialized data into a database after that data is received by the database system. Rather, the database system can structure new data into a partition of a data structure used by the database. Then, the database system exchanges the partition of the new data with another partition already existing in the database. This allows the database system to save time that would otherwise be required for writing data from an external data structure into the database. Furthermore, the database system does not have to use processing resources that would otherwise be needed for moving the data into the database.

Another important reason for the enhancement is the significant time saved in materializing new data. Since the new data is first materialized in a separate table, a great deal of performance leverage can be used to maximize the performance. For example, the new data can be inserted into index-free and constraint-free table, which can easily utilize all available parallel processing power of the machine. In addition, the indexes and constraints may be built in separate passes, which can also reap the performance benefit of maximum parallelism. Still further, no cleanup is required in the event that the building of the external table hits an error. This could save hours of users' time. In addition, embodiments of the invention enable the external table to be built outside of the data warehousing system. The external table may even be created on a separate machine. In this scenario, the external table can be transported into the data warehousing system using any fast transport mechanism. In this way, the materialization of the new data and the operations of the data warehousing system are accomplished quickly in comparison to traditional warehousing systems and techniques.

Among other advantages, embodiments of the invention provide that the time it takes for data to be entered into a table remains constant over a time period during which the table grows larger as a result of collecting more and more data. In contrast, the performance of prior systems drops over time because it takes longer to enter data into the table as the table gets larger, regardless of the size of the data being entered.

This advantage is particularly noticeable when a large amount of data is periodically added to an even larger database over a period of time. With current database systems, the time it takes to add the same amount of data to a database increases after each instance when the database is made incrementally larger with new data. But under a database system using an embodiment of the invention, the time it takes to add the same amount of data to a database remains about the same, even as the database becomes larger with periodic additions of new data.

According to an embodiment, an index is maintained for a table that can account for new data without impeding the performance of the database system. The index can grow with the database, but the size of the index does not impede the ability to make additions to it. This is possible because in a data warehousing system, indexes normally include (or can be made to include) the partition key columns. If partition key columns are part of the indexed columns, the indexes can be made local. In other words, each partition can build its own index for data located in the partition. When the top nodes of all partitional indexes are put together, the top nodes form a global index for the entire table. Such special organization of indexes make it possible to instantly merge a new partitional index into the larger index on a table.

Embodiments of the invention also provide for new data to be checked against local and global constraints before the new data is integrated with a data structure. This avoids the possibility that data just added to the database table or structure would have to be removed because of constraint failure. Furthermore, the database system does not have to check local constraints when new data is added using the techniques described herein. This saves considerable time and processing resources, because current database systems cannot just check local constraints for individual partitions, but rather are configured to check the whole table or data structure to ensure all constraints are obeyed whenever any select partition needs to be checked for satisfaction of its local constraints.

Under an embodiment of the invention, a partition exchange technique can be used to remove data from a database table. The partition exchange technique is simpler and less costly to employ than known processes for removing data from a database. For example, the partition exchange technique is simpler than deleting data from a database. The partition exchange technique can be used to move data from the database for purpose of archiving or deleting data. Once removed from the database, the database system can perform deleting or archiving operations on the removed data so as to not affect the database, or affect operations on the database.

System Diagram

FIG. 1 is a block diagram that gives a system overview of an embodiment of the invention. A database system 100 includes a data structure that stores data received from data sources 120. The data structure may be a table 110, stored in a database of database system 100. The database system 100 may also maintain an external table 130. The external table 130 is a data structure that is not part of table 110. The external table 130 may be generated in response to select events, such as in response to receiving data.

The table 110 may be made of rows and columns. According to an embodiment, table 110 is partitioned into a plurality of partitions 112 (labeled by P1, P2 . . . Pm). Each partition 112 includes one or more rows. The partitions 112 may be defined by a partition condition (PC1, PC2 . . . PCm). For example, a first one of the partitions 112 may correspond to a set of rows satisfying a first partition condition (PC1), and a second one of the partitions 112 may correspond to a set of rows satisfying a second partition condition (PC2). Each of the plurality of partitions 112 is assigned an identifier (e.g. P1, P2, Pm) within table 110.

In one embodiment, external table 130 is monolithic. That is, external table 130 has only one partition. That partition is defined by a partition condition that corresponds to one of the partition conditions in table 110 (i.e. PCm). An identifier is assigned to external table 130.

In another embodiment, external table 130 is partitioned into multiple partitions. A separate identifier may be assigned to each of the partitions in external table 130. Each of the partition(s) of external table 130 may have partition conditions that correspond to partition conditions of table 110.

According to one embodiment, external table 130 is a materialization of a new set of data received from data sources 120. The data items that populate external table 130 may be "new" in that they have yet to be integrated in table 110. After an exchange event, external table 130 is integrated into table 110, so that the table acquires the new set of data.

According to another embodiment, external table 130 is empty, but has a partition condition that corresponds to one of the partition conditions of a partition in table 110. The condition in table 130 is normally maintained through logical filter conditions when data are extracted from sources 120.

In response to an exchange event, external table 130 can be integrated with table 110 in order to remove partitions from table 110. Contents from a partition removed from table 110 may be deleted, archived, or moved to another computer system, once those contents are stored in external table 130. In this way, an empty partition can be substituted into table 110 in exchange for a populated partition, so as to enable data to be removed from table 110.

Still further, external table 130 may be populated with data items. The exchange event may be used to replace one or more populated partitions in table 110 with external table 130. In this way, data can be substituted into table 110 for other data. Other variations and combinations of these embodiments are possible.

The external table 130 is integrated with table 110 by exchanging the identifier of external table 130 with the identifier of a selected partition in table 110. For the purpose of explanation, it shall be assumed that external table 130 is to be exchanged with partition 114 of table 110.

The selected partition 114 has the same partition condition as external table 130. In the example shown by FIG. 1, external table 130 has an identifier labeled as "PCmnew", which is a unique to other partition identifiers in database system 100. The partition labeled as "Pcmnew" has a partition condition "PCm". The partition condition "PCm" is also shared by the partition 114 labeled as "Pm" in table 110.

The integration into table 110 of the data within external table 130 is performed by exchanging the identifier of external table 130 with the identifier of the selected partition 114 in table 110. In the example provided, an exchange operation gives external table 130 the identifier "Pm", so that contents of external table 130 are identified as being part of table 110. Similarly, the exchange operation gives partition 114, formerly identified as "Pm", the identifier of "Pmnew", so that partition 114 becomes part of external table 130. This exchange is done with no data being written from external table 130 into table 110, or from table 110 into external table 130. As such, processing resources of table 110 are conserved because the step of integrating external table 130 with table 110 involves exchanging identifiers, rather than inserting data from external table 130 into table 110.

Table 110 may have one or more local indexes. The table 110 may have all its indexes of local type. In a data warehousing system, this is normally the case because the partitioning conditions are normally used as a course grained search condition by business queries. While embodiments are described herein in the context of local indexes, other embodiments may be configured to provide for non-local (or global) indexes. Prior to the exchange operation, any indexes of table 110 will not have entries for the data in external table 130.

As part of the exchange operation, it may be necessary to cause an index of external table 130 to be combined with an index of table 110. The indexes may be combined without rearranging a significant portion of the table's index. The result is that the size of the index for table 110 does not significantly contribute to the work needed to combine the index of external table 130 with the index of table 110. Since the size of the table's index is dependent on the size of table 110, the performance of integrating external table 130 with table 110 is not impeded as table 110 grows larger.

In addition, database system 100 checks data belonging to external table 130 to ensure that relevant local constraints of table 110 are satisfied before integrating external table 130 with table 110. The external table 130 will not be integrated with table 110 if the contents of external table 130 fail the constraints of the corresponding partition in table 110 (i.e. local constraints of partition 114). Because the constraints are checked before the integration, rows added to table 110 during the integration will not have to be removed from table 110 after the rows have been integrated into table 110 simply because a later row fails to satisfy the constraints. Rather, external table 130 is integrated with table 110 only if applicable local constraints of the selected partition 114 are satisfied by all rows of external table 130.

Method for Inserting New Data into Database

Figure 2:
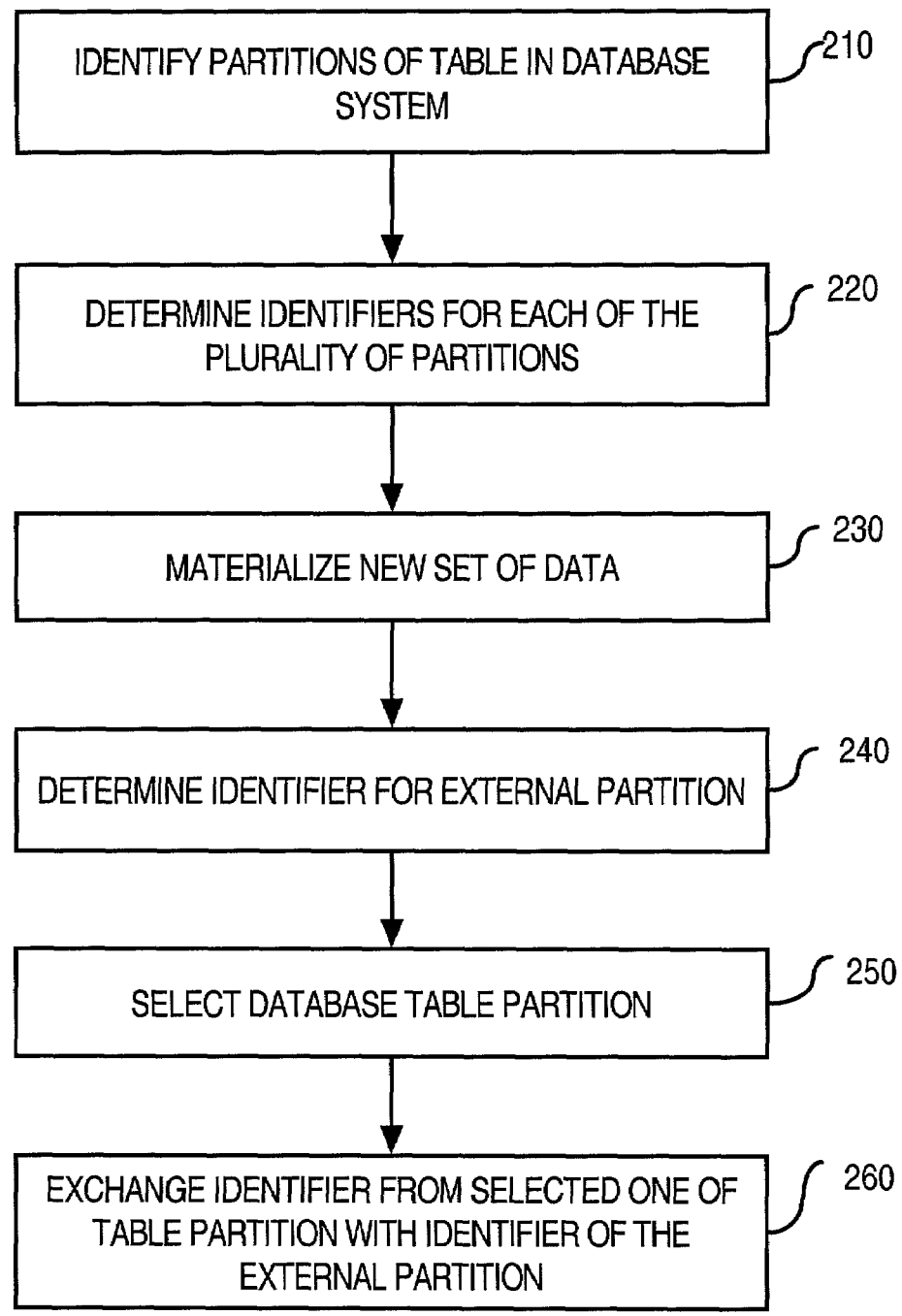
FIG. 2 is a flowchart illustrating steps of a method for inserting data into a database using partition exchange, under an embodiment of the invention.

FIG. 2 is a flowchart that illustrates a method for inserting data into a database using a partition exchange operation, according to an embodiment of the invention. Reference to elements of FIG. 1 is provided for illustrative purposes only.

In step 210, table 100 is partitioned into the plurality of partitions 112. The plurality of partitions 112 collectively form the table 110. Each partition 112 may consist of a set of rows that satisfy a partition condition for that particular partition. The partition condition may be designated by a configuration or user of database system 100.

Step 220 provides that identifiers may be determined for each of the plurality of partitions 112 in the table 110. The identifiers may correspond to metadata that uniquely identifies that partition from other partitions in the table 110. The table 110 is formed by logically combining partitions 112 according to their respective identifiers.

In step 230, a new set of data is materialized within database system 100, externally to table 110. The new set of data may be structured as an external partition, which in turn maybe implemented as an external table 130. In one embodiment, external table 130 implements a single external partition that has one partition condition that every data item in the new set of data satisfies. This partition condition is shared by one of the partitions 112 in table 110.

According to one aspect, external table 130 may be created without consideration for indexes and constraints, thereby improving the overall performance of the database system 100. As a result, new data may be inserted into external table 130 with minimum overhead and maximum parallelism. This results in a faster way of materializing new data.

Step 240 provides that an identifier is determined for the external table 130. The identifier for the external table 130 may correspond to metadata that can identify the external partition implemented by external table 130 from all of the partitions in database system 100.

In step 250, a partition in table 100 is identified for exchange with the external table 130. The partition thus identified is the partition of table 100 that has the same partition condition as the external table. In the present example, partition 114 has the same partition condition as external table 130. Thus, partition 114 is selected for exchange.

In step 260, the identifier from the identified partition 114 is exchanged with the identifier of external table 130. Only the identifiers are exchanged. Since the identifiers designate partitions 112 that form the table 100, exchanging the identifier of external table 130 with the identifier of one of the identified table partition 114 causes the content of external table 130 to become part of table 100.

In scenario given above, all of the new data satisfies partition condition PCm, and therefore only one external partition is involved in the exchange. However, it is possible for the new data to correspond to multiple partitions of table 100. For example, some of the new data items may satisfy the partition condition PC2, while other new data items satisfy the partition condition PCm. Under these conditions, the new data may be materialized into multiple external partitions, each of which would correspond to a different partition of table 110.

Each of the external partitions may be implemented as a separate external table, or a single partitioned external table may be used. During the exchange operation, each of the external partitions is exchanged with the corresponding partition of table 110 in the manner described above.

EXAMPLE FOR INSERTING DATA INTO THE DATABASE SYSTEM

Referring to FIG. 1, each partition condition (e.g. PC1, PC2 . . . PCm) may correspond to a time period. The partition condition for each partition corresponds to the time period that data for that partition was received by database system 100. Some partitions in table 110 are empty, but have partition conditions corresponding to future time periods where data may be received by database system 100.

When new data is received by database system 100, the data is first materialized in external table 130. The partition condition for external table 130 corresponds to the time period when the new data is received. When external table 130 is integrated into table 110, the table partition 112 that is selected for exchange has the same partition condition as external table 130. In other words, the selected table partition has the same time period for its partition condition as external table 130.

As mentioned above, the partition exchange is performed by giving the identifier for external table 130 to the selected partition 114 of table 110. The identifier of the selected partition 114 is given to external table 130. The external table 130 becomes part of table 110, because the table is formed by logically combining partitions identified by their respective identifiers.

Combining External Partition Index with Table Index

Figure 3:
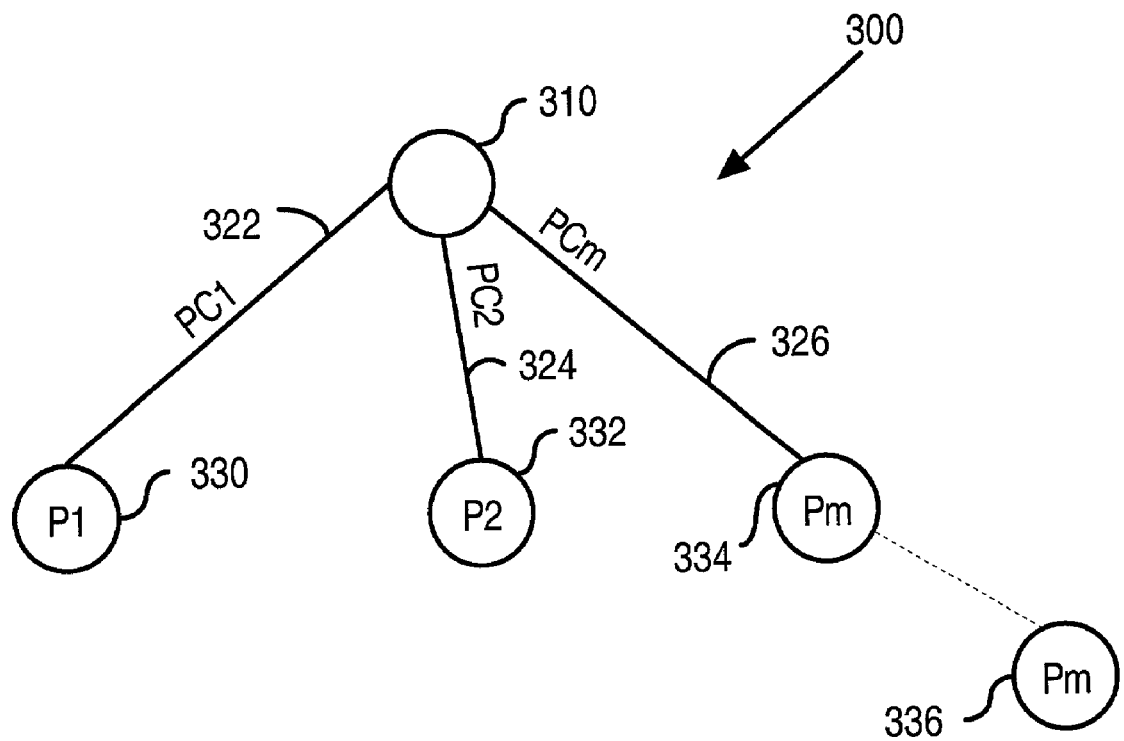
FIG. 3 is a diagram of a database system index being combined with index information of new data being entered into a table, under an embodiment of the invention.
Figure 4:
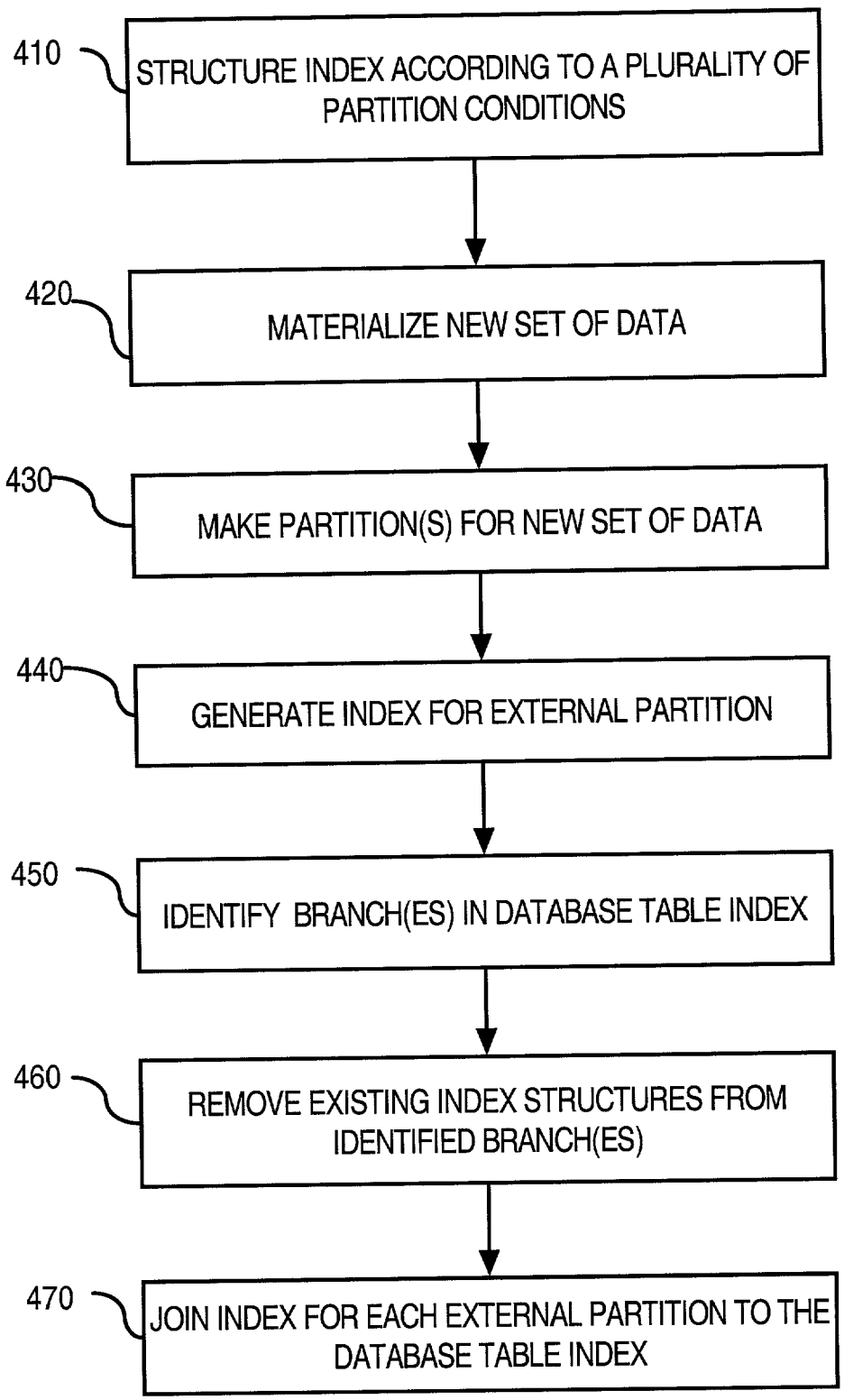
FIG. 4 is a flowchart illustrating steps of a method for combing a database system index with index information of new data being entered into a table, under an embodiment of the invention.

FIG. 3 is a diagram of a database index being combined with index information for new data that is to be entered into a table. FIG. 4 is a flowchart for a method for combining a database index with index information of the new data. Reference to elements of FIG. 1 in descriptions of FIGS. 3 and 4 is provided for illustrative purposes only.

In FIG. 3, an index 300 is for table 110. The index 300 includes atop node 310, and a plurality of branches 322–326. Each branch 322–326 links the top node 310 to a sub-node 332–336. For purpose of discussion, it is assumed that index 300 is a local index.

When the index is built on the partitioning key of a partitioned table, the partition conditions for the partitions are used to form the plurality of branches. Each sub-node 332–336 represents index information for a partition defined by that partition condition.

Accordingly, first branch 322 stems from top node 310 to first sub-node 330. The first branch 322 may correspond to first partition condition (i.e. PC1) of first partition (i.e. P1) in table 110. The first sub-node 330 may correspond to index information about the first partition (P1). The second branch 324 stems from top node 310 to second sub-node 332. The second branch 324 may correspond to the second partition condition (PC2, see FIG. 1) for a second partition (P2, see FIG. 1) on table 110. The second sub-node 332 may correspond to index information about the second partition (P2). More branches link top node 310 to other partitions of table 110. The branch 326 signifies partition condition PCm, for a sub-node 334. Before the exchange event, sub-node 334 represents index information for the partition that is to be removed table 110. In an embodiment such as described with FIG. 2, sub-node 334 may be empty.

Index information for new data is represented by sub-node 336. The index information may be generated for the new data when the new data is materialized as external table 130. When new data is materialized as external table 130, the partition condition for external table 130 (PCm) corresponds to the partition condition of one of the partitions 112 existing in table 110. In response to an exchange event, index 300 is changed by replacing sub-node 334 with sub-node 336. After the exchange event, index information of sub-node 336 stems from top node 310 via branch 326.

After the partitions are exchanged, branch 326 links top node 310 to the index information about external table 130. The remaining portion of index 300 is unaffected by the partition exchange. The only difference that results in index 300 after the exchange event is that the sub-node 326 contains index information for external table 130, rather than for the partition that was just exchanged out of the table 100. The branch 326, signifying the partition condition PCm, shared by the empty partition Pm and by external table 130, also remains as the link between top node 310 and sub-node 326.

FIG. 4 illustrates a method for combining an index of an external partition with an index of the table. The indexes are combined for purpose of inserting data into table 110. Reference to numerals in FIG. 3 is for illustrative purposes only.

In step 410, an index for table 100 is structured according to a plurality of partition conditions. Each partition condition may correspond to an index branch (i.e. 322–326) off of top node 310 of the index 300.

In step 420, a new set of data is materialized in database system 100. The new set of data may be received from data sources 120 in a loading process. For example, an ETL tool may cause data to be moved from data sources 120 into database system 100.

In step 430, one or more external partitions are made for the new set of data. Each external partition is defined by a partition condition. Each of the external partitions may be structured as a separate external table, or as a separate partition of a single external table. For the purpose of explanation, it will be assumed that the new data falls into a single external partition that is implemented as external table 130.

Step 440 provides that an index is generated for each external partition. Each index is structured as if the external partition is a monolithic table. For example, the index for external table 130 may be structured as a B*-Tree index. Among other advantages, embodiments of the invention enable indexes to be built rapidly on newly received data. For example, parallel processing may be maximized during index creation of monolithic tables. Under more traditional techniques for loading new data into data warehousing systems, this is not possible.

In step 450, a branch is identified in the index 300 of table 100, where the identified branch corresponds to a partition condition shared by table 100 and external table 130. When multiple external partitions are involved, a separate branch of index 300 is identified for each of the external partitions.

Step 460 provides that existing index structures stemming from branches identified in step 450 are removed. For example, in FIG. 3, the index structure corresponding to sub-node 334 is removed after the exchange event.

When data is being entered into table 100 through an exchange operation, the index structures from those branches may be empty. As such, it is possible that step 460 is unnecessary, as index structures for empty partitions may not exist in index 300.

In step 470, the index of each external partition is joined to the branch of index 300 corresponding to the partition condition shared by that external partition. In this way, the index of each external structure is adjoined to a branch of index 300 without affecting the indexes other branches.

One advantage offered by an embodiment of the invention is that the branches of index 300 can be appended individually to account for index information for new data, so as to not affect other branches. When new data is added to table 110, index 300 does not have to be reconstructed to account for balancing and depth. For example, index 300 does not have to be re-balanced about top node 310 when new data is entered into table 110. In comparison to other systems that maintain indexes that require reconstructing to account for new data, adding index information such as described with FIGS. 3 and 4 requires very little processing resources or time.

EXAMPLE FOR COMBINING INDEXES WHEN INSERTING DATA INTO DATABASE

The following is an example of a method of FIG. 4, using elements in FIGS. 1 and 3 for illustrative purposes.

Each partition in table 110 may have a partition condition corresponding to a day of a week. The partitions contain data received on the day of the week signified by the partition condition. For example, PC1 may correspond to Sunday, and PC2 may correspond to Monday. On a Friday, before new data is received by database system 100, two of the partitions in the week are empty. The empty partitions correspond to Friday and Saturday.

The index 300 is maintained in database system 100 for table 110. Each partition 112 of table 110 is assigned a branch 322–326 in index 300. For example, top node 310 may correspond to a week. Each branch 322–326 from top node 310 may correspond to one of the days in the week.

The external table 130 may be structured from materialized data received from data sources 120 on any particular day of the week. The external table 130 may correspond to one partition in table 110. The external table 130 shares a partition condition with that partition in table 110. In this example, the external table 130 and one of the partitions in table 110 share a day of the week as their partition condition. If new data is received on Friday, the partition condition for external table 130 and for an empty partition in table 110 is Friday.

When external table 130 is integrated into table 110, the partition condition of external table 130 identifies which partition is replaced in table 110. In this example, the existing Friday partition in table 110 is replaced by external table 130 in response to the exchange event.

Prior to the exchange event, database system 100 maintains index 300 for target table 110. The branch 334 signifies the Friday partition condition. Sub-node 334 is empty. An index is generated for external table 130 when data is materialized in external table 130. The index generated for external table 130 may be structured to treat external table 130 as a monolithic table. For example, the index for external table 130 may be a B*-Tree index.

After the exchange event, index information for external table 130 is moved into index 300 as sub-node 336. The branch 328 (for Friday) locates the sub-node 336.

It is possible to create an index where every branch from top node 310 locates a B*-Tree sub-index. Index information from external table 130 is simply added as sub-node 336 to one of the branches 326 of index 300. None of the other sub-nodes 322, 324 are affected by adding sub-node 326.

One advantage provided in assigning an index of external table 130 to a branch of index 300 is that the two indexes can be integrated quickly. In particular, the two indexes can be integrated in an operation whose performance is independent of the size of index 300.

Managing Constraints When Inserting Data into Database

Figure 5:
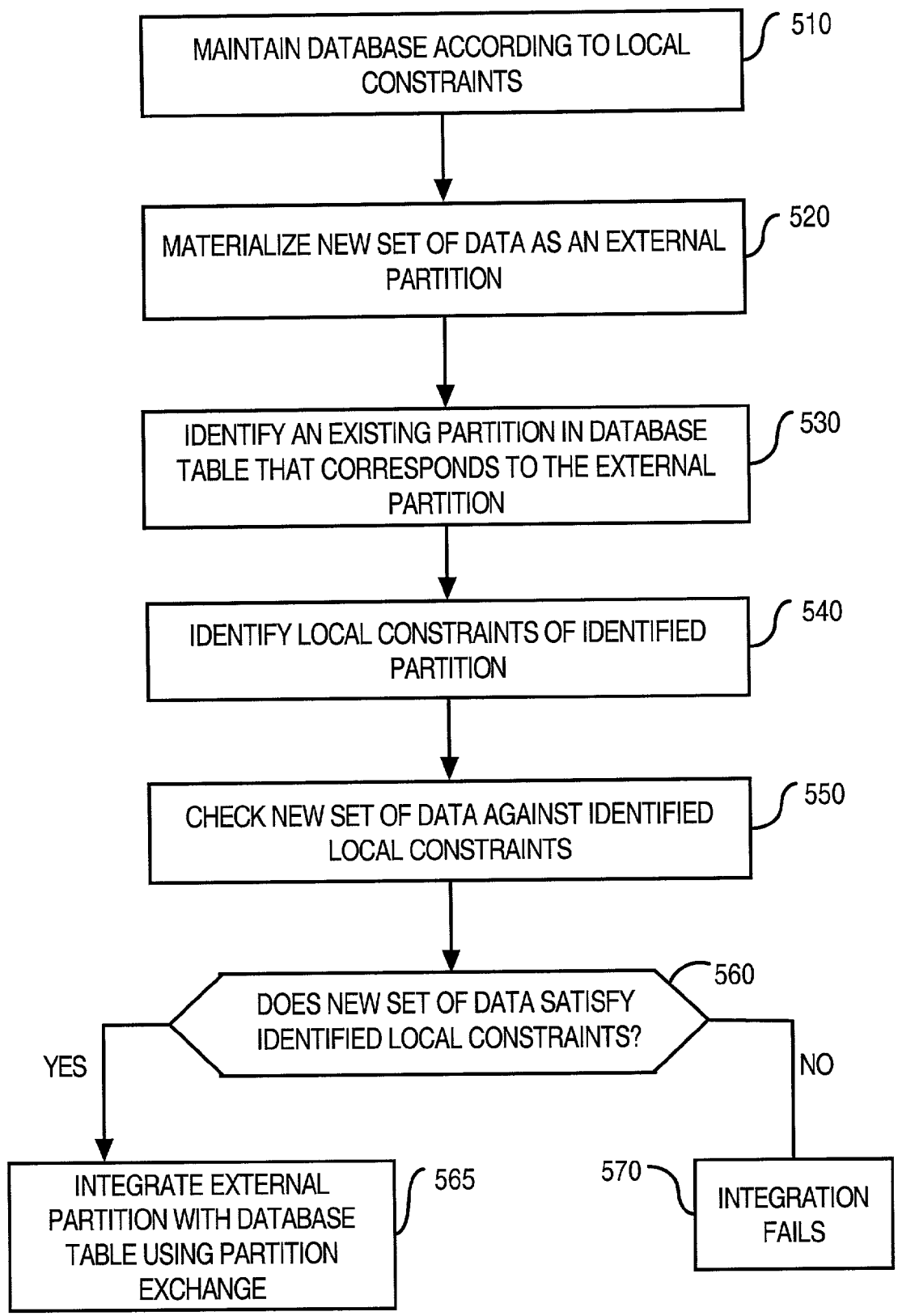
FIG. 5 is a flowchart illustrating steps of a method for checking new data against local database constraints before the new data is added to the database, under an embodiment of the invention.

FIG. 5 illustrates a method for managing constraints when data is entered into database system 100. Reference to numerals of FIG. 1 are provided for illustrative purposes.

Step 510 provides that table 110 is maintained according to local constraints set by a user or operator of database system 100. For example, the user may require that select partitions in table 110 satisfy a constraint. The partitions selected for obeying constraints may be empty, and awaiting partition exchange to store new data.

In step 520, a new set of data is materialized in external table 130. The external table 130 has one or more partitions, each set by a partition condition.

In step 530, an existing partition in table 110 is identified that corresponds to the partition of external table 130. The existing partition in table 110 may be identified because it has the same partition condition as external table 130. This existing partition may also be empty, or available to be exchanged.

In step 540, the local constraints for the existing partition identified in step 530 are identified. The local constraints for this partition may be different than the constraints of other partition in database 110.

In step 550, the new set of data structured in external table 130 is checked against the local constraints identified in step 540.

In step 560, a determination is made as to whether the new set of data in external table 130 satisfies the local constraints identified in step 540. For example, the local constraint may specify that each data item in a column of the partition is unique from other items in the same column. Then, the determination in step 560 checks external table 130 to determine whether any data item in the column designated by the local constraint is repeated.

If the local constraints are satisfied by the new set of data in external table 130, then step 565 provides that external table 130 is integrated with table 110 using a partition exchange technique such as described by FIG. 2. The external table 130 may be given the identifier of the existing partition in table 110. In addition, an index generated for external table 130 may be integrated with the index of table 110, such as described with FIG. 4.

If the local constraints are not satisfied by the new set of data in external table 130, then step 570 provides that external table 130 is not integrated with table 110. Any attempt by a user to cause the integration to occur fails.

Embodiments of the invention take into account the possibility that local constraints will fail when a new set of data is integrated into table 110. Unlike prior systems, new data is checked against constraints prior to the new data being integrated into table 110. Therefore, if the constraint fails as a result of new data, the new data does not have to be removed from table 110. Rather, the integration never occurs.

Furthermore, table 110 does not have to check local constraints after new data is entered into it via external table 130. Database systems are generally not equipped to be selective in checking partitions for satisfaction of local constraints. Rather, the database systems must check all partitions for all constraints in order to check any local constraint of any one partition. By checking new data against selected partitions before the exchange event, this limiting feature of database systems can be avoided altogether. As such, embodiments of the invention conserve considerable time and processing resources from database system 100, because constraints can be checked selectively for individual partitions.

Using Partition Exchange to Manage the Database System

In addition to inserting data into database system 100, partition exchange methods such as described above can be used to perform other functions on table 110. In particular, partition exchange techniques can be used to perform functions connected with removing data from table 110. These functions include archiving, deleting or moving data from database system 100 to other computer systems or mediums.

Figure 6:
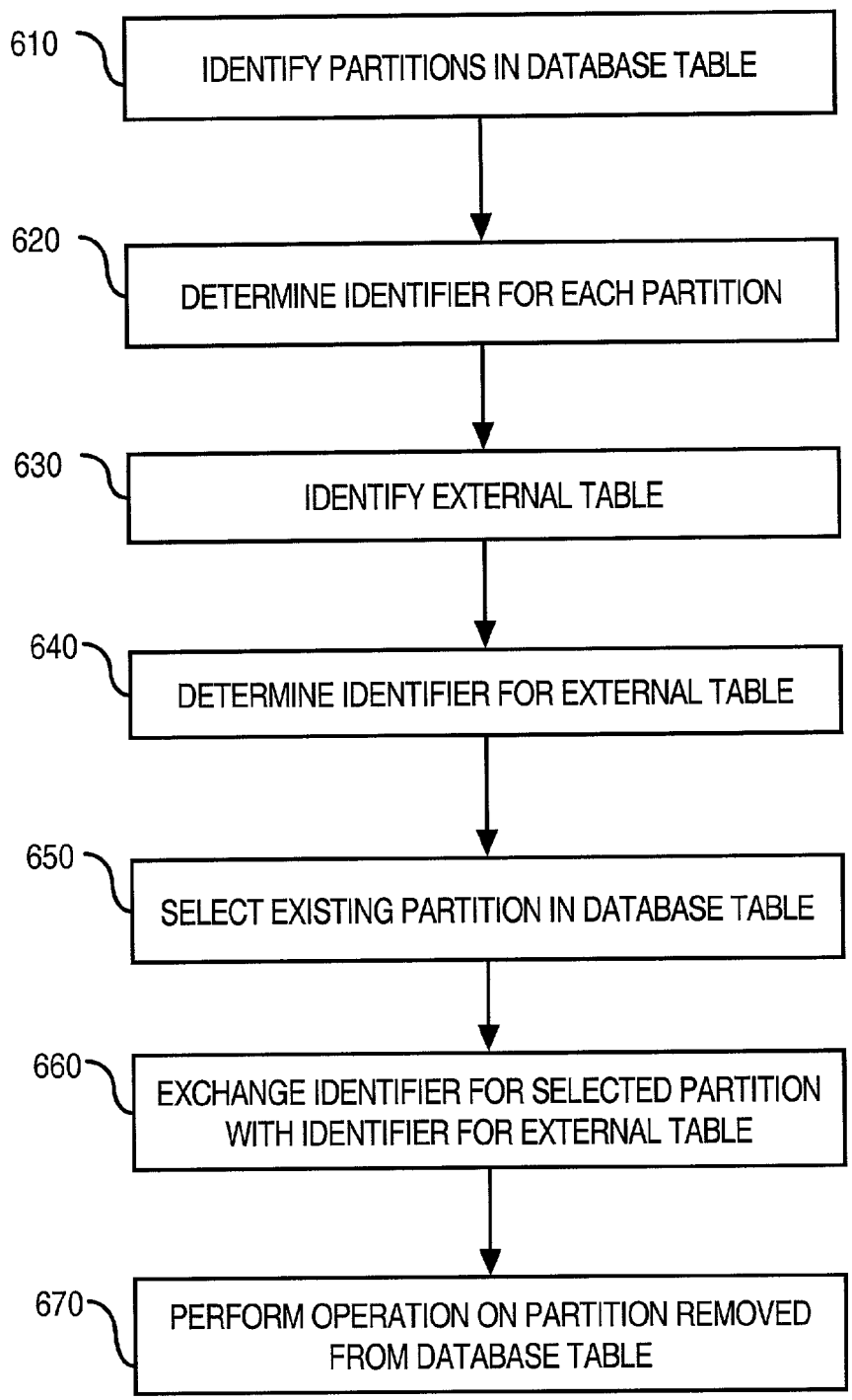
FIG. 6 is a flowchart illustrating steps of a method for using partition exchange to remove and perform an operation on data in a database, under an embodiment of the invention.

FIG. 6 illustrates a method for performing these operations. Reference to numerals in FIG. 1 are provided for illustrative purposes.

Step 610 provides that partitions of table 110 are identified. For example, table 110 may be segmented using a plurality of partition conditions.

In step 620, an identifier for each partition is determined. The partition identifiers may correspond to metadata, such as a partition name, for each partition. The identifier for each partition identifies a corresponding partition from all other partitions in table 110.

In step 630, external table 130 is identified. For purposes of removing data from table 110, the external table 130 may be empty. The external table 130 may be generated to have a partition condition corresponding to one of the existing partitions in table 110.

Step 640 provides that an identifier for external table 130 is determined. The identifier may be generated by database system 100 when the external table 130 is created.

In step 650, one of the existing partitions in table 130 is selected. The selection may be based on the operation that is to be performed. For example, the oldest data in table 130 may be periodically removed for purpose of archiving data stored in table 110. Then, the partition defined by the oldest time period is selected in this step.

In step 660, the identifier for the selected partition of table 110 is exchanged with the identifier for external table 130. This step is done in response to the exchange event. After the exchange event, external table 130 forms part of table 110. This is because table 110 is a logical combination of partitions identified according to their identifiers.

In step 670, an operation is performed on the partition that was removed from table 110.

A removed partition may be handled in many ways. Deletion and archiving operations may be performed within database system 100. Alternatively, the selected partition may be transferred from database system 100. For example, the selected partition removed from table 110 may be transferred to another computer, and then deleted. Alternatively, the selection partition removed from table 110 may be transferred to another computer and saved, for purpose of archiving data in table 110. For example, a magnetic tape may be used to store data from the removed partition.

By avoiding a full-fledged deletion or archiving operation, processing and storage resources of database system 100 may be focused on maintaining and/or inserting data into table 110.

EXAMPLES FOR REMOVING DATA FROM A TABLE

In one embodiment, select partitions with data are removed from table 110 and replaced with empty partitions. The following is an example of a method of FIG. 6, using elements in FIG. 1 for illustrative purposes.

In an embodiment, a partition may be selected that is filled with data. The partition may, for example, be selected based on age. According to a method such as described with FIG. 6, this partition may be exchanged with an empty partition, provided by external table 130. The exchange may take place by assigning external table 130 the identifier of the selected partition in table 110. Concurrently, the selected partition may be assigned an identifier of external table 130.

Once the selected partition is removed, some operation may be performed on data contained in the removed partition. Examples of such partitions include deleting, archiving, or moving the data in the removed partition.

To remove data for purpose of deletion or archiving, external table 130 may be empty and given the same partition condition as the partition selected for removal. After the exchange event, contents of external table 130 occupy the same position in the table 110 as the removed partition in table 110. But database 110 has new empty space from the partition that was exchanged in.

In another example, external table 130 may be given a different partition condition than the partition condition of the selected partition in table 110. But the identifier of the selected partition in table 110 may still be exchanged with the identifier of external table 130. In this way, external table 130 occupies a new segment in table 110, but is identified as the previous partition.

For example, prior to an exchange event, external table 130 may correspond to a new set of data, given the partition condition of Friday. During the exchange event, external table 130 may be given the identifier of another partition in table 110, having a Sunday partition condition. After the exchange event, external table 130 is in table 110 using the identity of the Sunday partition. But the external table 130 is the Friday partition for table 110, since its partition condition does not change. The older Sunday partition is removed after the exchange event.

Hardware Overview

Figure 7:
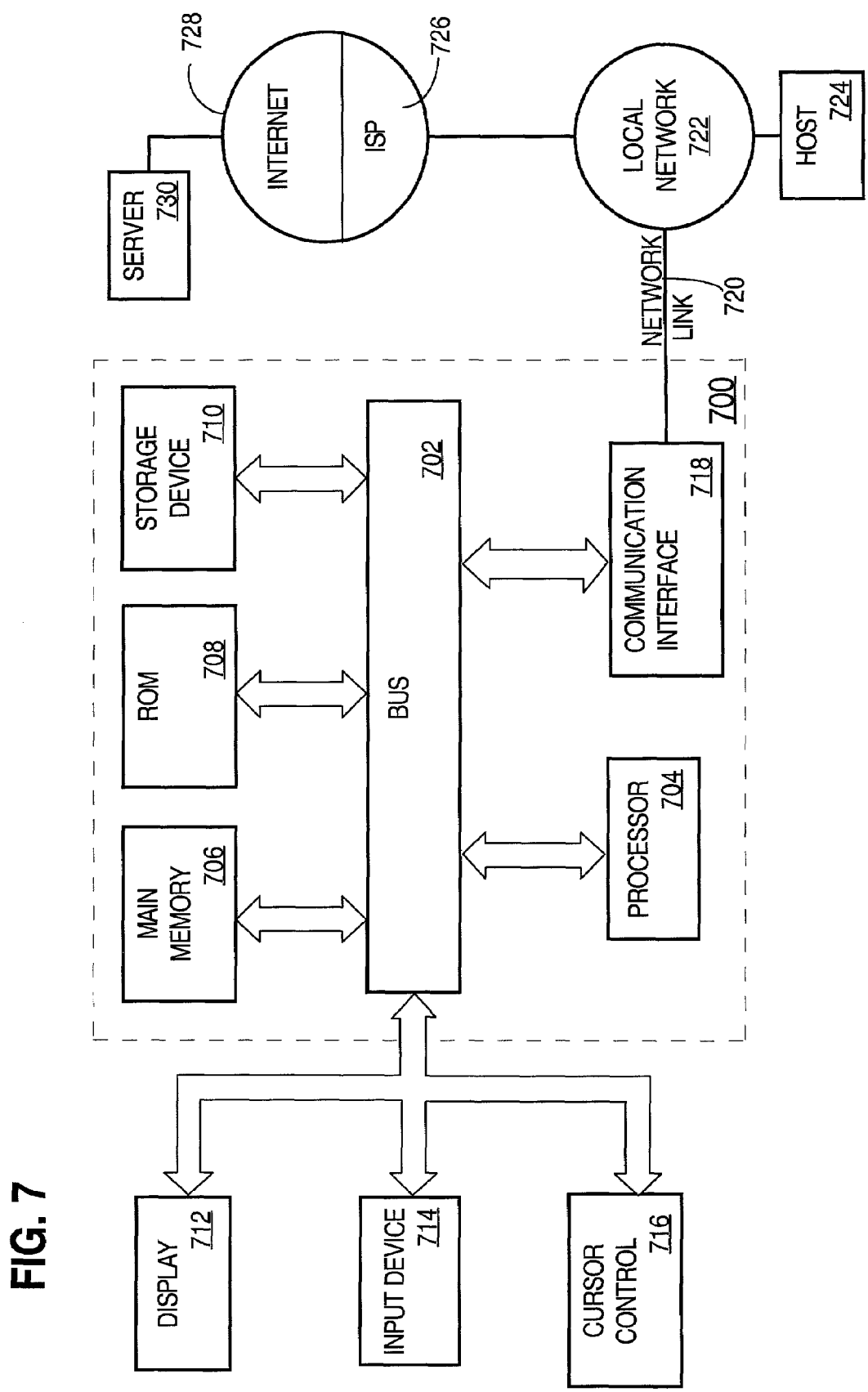
FIG. 7 is a hardware diagram of a computer system that may be used to implement an embodiment of the invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method for adding data to a database system, the method comprising:
   storing a set of existing data in a first data structure of the database;
   receiving a new set of data from an external data source;
   materializing the new set of data within the database, in a second data structure, wherein the second data structure is separate, and does not form any part of, the first data structure; and
   after the new set of data is materialized in the second data structure, inserting the new set of data into the first data structure of the database by causing the second data structure to become part of the first data structure.

2. The method of claim 1, wherein:
   said first data structure is formed by a plurality of partitions, wherein a first identifier identifies a particular partition of the plurality of partitions;
   wherein the step of inserting the new set of data into the first data structure includes re-assigning the first identifier to identify the second data structure so that the second data structure is identified as one of the plurality of partitions that forms the first data structure.

3. The method of claim 2, wherein the new set of data is materialized in the database before the first identifier is re-assigned to identify the second data structure.

4. The method of claim 3, wherein the first data structure is a table, and the step of materializing the new set of data includes materializing the new set of data as a new table within the database system.

5. The method of claim 4, wherein the step of materializing the new set of data includes materializing the new set of data in an unpartitioned table.

6. The method of claim 5, wherein the step of materializing the new set of data in an unpartitioned table includes performing an insert operation so that the new data is inserted into the unpartitioned table.

7. The method of claim 2, wherein the step of inserting the new set of data into the first data structure further comprises:
   assigning a second identifier to the new set of data; and
   replacing the second identifier with the first identifier so that the first identifier identifies the second data structure.

8. The method of claim 2, wherein said first data structure is partitioned according to a plurality of partition conditions, and wherein each partition of the plurality of partitions corresponds to a partition condition.

9. The method of claim 8, wherein the first data structure is partitioned according to a plurality of time periods.

10. The method of claim 2, further comprising:
    maintaining an index for the first data structure;
    generating a new index for the new set of data; and wherein the step of inserting the new set of data into the first data structure comprises the step of combining the new index with the index of the first data structure.

11. The method of claim 10, wherein
said first data structure is partitioned according to a plurality of partition conditions;
each partition of the plurality of partitions corresponds to a partition condition;
the particular partition is associated with a particular partition condition;
maintaining an index for the first data structure includes maintaining an index that has a branch associated with a particular partition condition; and
combining the new index with the index of the first data structure comprises attaching the new index to the branch associated with the particular partition condition.

12. The method of claim 2, wherein the method further comprises:
identifying a constraint for the particular partition;
before re-assigning the first identifier to identify the second data structure, checking the new set of data to determine if the new set of data satisfies the constraint; and
if the new set of data satisfies the constraint, then re-assigning the first identifier to identify the second data structure.

13. The method of claim 12, wherein the step of re-assigning the first identifier to identify the second data structure is only performed if the new set of data satisfies the constraint.

14. The method of claim 2, wherein the step of re-assigning the first identifier to identify the second data structure includes replacing an existing identifier that currently identifies a partition of the plurality of partitions with a new identifier that identifies the second data structure.

15. The method of claim 14, wherein materializing the new set of data into the second data structure includes materializing the new set of data into a plurality of external partitions that are separate from the first data structure.

16. The method of claim 2, wherein materializing the new set of data into the second data structure comprises:
structuring the second data structure as one or more tables external to the first data structure; and
re-assigning the first identifier that identifies a specific partition, of the plurality of partitions, forming the first data structure, to identify a specific table of the one or more tables external to the first data structure; and
re-assigning, a second identifier that identifies the specific table, to identify the specific partition.

17. The method of claim 2, wherein each of the plurality of partitions, forming the first data structure, are associated with a partition condition that corresponds to a time period.

18. The method of claim 2, wherein the first data structure is a table, and the second data structure is a monolithic table.

19. The method of claim 1, wherein:
said first data structure is formed by a plurality of partitions, the plurality of partitions including one or more available partitions, each partition having a partition condition;
the method includes assigning a first identifier to at least one of the one or more available partitions to identify, to the database system, a particular available partition of the one or more available partitions;
the second data structure is a partition, the second data structure having the same particular partition condition as a first available partition, of the one or more available partitions;
the method includes assigning a second identifier to the second data structure that identifies, to the database system, the second data structure; and
wherein the step of inserting the new set of data into the first data structure includes re-assigning the first identifier to identify, to the database system, the second data structure, so that the second data structure is identified as one of the plurality of partitions that forms the first data structure.

20. The method of claim 19, further comprising re-assigning the second identifier of the external partition to identify the first available partition in conjunction with re-assigning the identifier of the first available partition to identify the external partition.

21. The method of claim 19, further comprising:
identifying a constraint of the first available partition;
after receiving the new set of data, checking the external partition to determine if the external partition satisfies the constraint; and
re-assigning the identifier of the first available partition to identify the external partition if the external partition satisfies the constraint.

22. The method of claim 19, wherein the partition condition for each partition corresponds to a time period.

23. The method of claim 19, further comprising:
maintaining an index for the first data structure;
generating a new index for the external partition; and
combining the new index with the index of the first data structure in conjunction with re-assigning the first identifier to the external partition.

24. The method of claim 23, further comprising arranging the index of the first data structure into a top node and a plurality of branches to the top node, each of the plurality of branches corresponding to one of the partition conditions, each branch having a top node that corresponds to the partition of the partition condition corresponding to that branch.

25. The method of claim 24, further comprising including the new set of data in the first data structure as a partition defined by the partition condition of the first available partition, and wherein combining the index of the external partition with the index of the first data structure includes assigning the index of the external partition to be a new branch to the top node of the index of the first data structure.

26. The method of claim 19, wherein re-assigning the identifier of the first available partition to identify the external partition includes replacing an identifier of the external partition with the identifier of the first available partition.

27. The method of claim 1, further comprising:
generating an index for the set of existing data; and
modifying the index to account for the new set of data in response to inserting the new set of data into the first data structure.

28. The method of claim 27, wherein:
inserting the new set of data into the first data structure of the database includes inserting the new set of data as a replacement partition for another partition in the first data structure;
generating an index for the set of existing data includes arranging the index into a first node and a plurality of branches, each partition in the first data structure corresponding to a branch in the index; and modifying the index to account for the new set of data includes integrating a new index portion corresponding to the new set of data into the index for the first data structure, the new index portion being attached to a branch of the index that corresponds to the replacement partition.

29. A computer-readable medium carrying instructions for adding data to a database system, the instructions comprising instructions for performing steps of:

storing a first data structure formed by a plurality of partitions, wherein a first identifier identifies a particular partition of the plurality of partitions;

receiving a new set of data into a second data structure that is separate from the first data structure; and re-assigning the first identifier to the second data structure so that the second data structure is identified as one of the plurality of partitions that forms the first data structure.

30. The computer readable medium of claim 29, further comprising instructions for materializing the new set of data before re-assigning the first identifier to identify the second data structure.

31. The computer readable medium of claim 30, wherein the first data structure is a table, and wherein instructions for materializing the new set of data include instructions for materializing the new set of data as a new table within the database system.

32. The computer readable medium of claim 31, wherein instructions for materializing the new set of data include instructions for materializing the new set of data in an unpartitioned table.

33. The computer readable medium of claim 32, wherein instructions for materializing the new set of data in an unpartitioned table include instructions for performing an insert operation so that the new data is inserted into the unpartitioned table.

34. The computer readable medium of claim 29, further comprising instructions for assigning a second identifier to the new set of data, and wherein instructions for re-assigning the first identifier to the second data structure include instructions for replacing the second identifier with the first identifier so that the first identifier identifies the second data structure.

35. The computer readable medium of claim 29, wherein the first data structure is partitioned according to a plurality of partition conditions, and wherein each partition of the plurality of partitions corresponds to a partition condition.

36. The computer readable medium of claim 35, wherein the first data structure is partitioned according to a plurality of time periods.

37. The computer readable medium of claim 29, further comprising instructions for:

maintaining an index for the first data structure;

generating a new index for the new set of data; and combining the new index with the index of the first data structure in conjunction with re-assigning the first identifier to identify the second data structure.

38. The computer readable medium of claim 37, wherein:

the first data structure is partitioned according to a plurality of partition conditions, wherein each partition of the plurality of partitions corresponds to a partition condition;

the first identifier is initially associated with a particular partition;

the particular partition is associated with a particular partition condition;

instructions for maintaining an index for the first data structure include instructions for maintaining an index that has a branch associated with a particular partition condition; and instructions for combining the new index with the index of the first data structure comprises instruction for attaching the new index to the branch associated with the particular partition condition.

39. The computer readable medium of claim 29, wherein the first identifier is initially associated with a particular partition, the computer readable medium further including instructions for performing the steps of:

identifying a constraint for the particular partition;

before re-assigning the first identifier to identify the second data structure, checking the new set of data to determine if the new set of data satisfies the constraint; and if the new set of data satisfies the constraint, then re-assigning the first identifier to identify the second data structure.

40. The computer readable medium of claim 39, further comprising instructions for re-assigning the first identifier to identify the second data structure only if the new set of data satisfies the constraint.

41. The computer readable medium of claim 29, wherein instructions for storing the first data structure include instructions for associating one or more available partitions with the first data structure, and wherein instructions for re-assigning the first identifier to identify the second data structure includes instructions for replacing an identifier of one or more of the available partitions with an identifier of the second data structure.

42. The computer readable medium of claim 41, wherein instructions for receiving the new set of data into the second data structure include instructions for receiving the new set of data into a plurality of partitions that are external to the data structure, and wherein the computer readable medium further includes instructions for re-assigning an identifier of one or more of the available identifiers to identify each of the external partitions.

43. The computer readable medium of claim 29, wherein instructions for receiving the new set of data into the second data structure include instructions for structuring the second data structure as one or more tables external to the data structure, and wherein the computer readable medium further includes instructions for re-assigning an identifier of one or more available partitions with an identifier of a corresponding one the one or more tables external to the data structure.

44. The computer readable medium of claim 29, wherein the partition condition for the first available partition corresponds to a time period where the new set of data is received by the database system.

45. The computer readable medium of claim 29, wherein the first data structure is a table, and the external partition is a monolithic table.

46. A computer readable medium carrying instructions for adding data to a database system, the instructions including instructions for performing steps of:

storing a first data structure formed by a plurality of partitions, the plurality of partitions including one or more available partitions, each partition, of the plurality of partitions, having a partition condition;

assigning a first identifier to identify at least one of the one or more available partitions;

receiving a new set of data;

storing the new set of data as an external partition to the data structure, wherein the external partition has the same a partition condition as a specific partition of the one or more available partitions that form the data structure;

assigning an second identifier to identify the external partition; and re-assigning the first identifier of the first available partition to the external partition so that the external partition is identified as one of the plurality of partitions that form the data structure.

47. The computer readable medium of claim 46, further comprising instructions for re-assigning the second identifier of the external partition to identify the first available partition in conjunction with re-assigning the first identifier of the first available partition to identify the external partition.

48. The computer readable medium of claim 46, further comprising instructions for performing the steps of:
identifying a constraint of the specific partition;
after receiving the new set of data, checking the external partition to determine if the external partition satisfies the constraint; and
re-assigning the first identifier of the first available partition to identify the external partition if the external partition satisfies the constraint.

49. The computer readable medium of claim 46, wherein the partition condition for each partition corresponds to a time period.

50. The computer readable medium of claim 46, further comprising instructions for performing the steps of:
maintaining an index for the first data structure;
generating a new index for the external partition; and
combining the new index with the index of the first data structure in conjunction with re-assigning the first identifier to identify the external partition.

51. The computer readable medium of claim 50, further comprising instructions for arranging the index of the first data structure into a top node and a plurality of branches to the top node, each of the plurality of branches corresponding to one of the partition conditions, each branch having a top node that corresponds to the partition of the partition condition corresponding to that branch.

52. The computer readable medium of claim 51, further comprising instructions for including the new set of data in the first data structure as a partition defined by the partition condition of the specific partition, and wherein instructions for combining the index of the external partition with the index of the first data structure includes instructions for assigning the index of the external partition to be a new branch to the top node of the index of the first data structure.

53. The computer readable medium of claim 46, wherein instructions for re-assigning the identifier of the specific partition to the external partition includes instructions for replacing an identifier of the external partition with the identifier of the first available partition.

* * * * *

UNITED STATES PATENT AND TRADEMARK OFFICE
CERTIFICATE OF CORRECTION

PATENT NO. : 7,020,656 B1 Page 1 of 1
APPLICATION NO. : 10/154751
DATED : March 28, 2006
INVENTOR(S) : Yu Gong It is certified that error appears in the above-identified patent and that said Letters Patent is hereby corrected as shown below:

<u>Column 18</u>
Claim 2, line 32; delete "partitions;" and insert --partitions; and--.

<u>Column 23</u>
Claim 46, line 3: delete "same a partition" and insert --same partition--.

Signed and Sealed this

Twenty-ninth Day of August, 2006

JON W. DUDAS
*Director of the United States Patent and Trademark Office*